April 15, 1930.  A. KINGSBURY  1,754,324
BEARING
Filed June 23, 1922   3 Sheets-Sheet 1

Inventor
Albert Kingsbury
By Mauro, Cameron, Lewis & Massie
Attorneys

April 15, 1930. A. KINGSBURY 1,754,324
BEARING
Filed June 23, 1922  3 Sheets-Sheet 2

Inventor
Albert Kingsbury
By Mauro, Cameron, Lewis & Massa
Attorneys

April 15, 1930.  A. KINGSBURY  1,754,324
BEARING
Filed June 23, 1922  3 Sheets-Sheet 3

Inventor
Albert Kingsbury

By Mauro, Cameron, Lewis & Massey
Attorneys

Patented Apr. 15, 1930

1,754,324

UNITED STATES PATENT OFFICE

ALBERT KINGSBURY, OF GREENWICH, CONNECTICUT, ASSIGNOR TO KINGSBURY MACHINE WORKS, INC., OF PHILADELPHIA, PENNSYLVANIA, A CORPORATION OF DELAWARE

BEARING

Application filed June 23, 1922. Serial No. 570,330.

This invention relates to bearings and, more particularly, to bearings wherein elastic means are interposed between one or more of the bearing members and the support or abutment for the same.

It has heretofore been suggested to interpose elastic means between a bearing member and its support or abutment so that the bearing pressure will be equitably distributed over the bearing surfaces. If such elastic means is sensitive in responding to variations of pressure, there is danger that periodically recurring variations of pressure will set the elastic means into vibration so as to cause an undesirable oscillatory movement of the bearing members. Particularly is this true if such recurring impulses approximate the natural period of vibration of said elastic means. The recurring impulses which may thus set the bearing into vibration may arise from the action of the bearing itself, as for example where an irregularity or lack of trueness in the bearing surfaces causes a progressive compression and expansion of the elastic means at each rotation of the shaft, or they may arise from the action of the driving or driven members on the bearing, as for example where the water in the draft tube tends to vibrate the thrust bearing of a hydro-electric unit. If these recurring impulses set the elastic means into material vibration, there is danger that the resultant oscillatory movement of the bearing members may be in excess of that proper for the desired or proper operation of the bearing or its associated parts.

It is an object of this invention to provide a bearing, comprising elastic means between one or more of the bearing members and the support or abutment for the same, with means for preventing or controlling any tendency of the bearing members to be set into vibration by the action of such elastic means.

A further object of this invention is to provide a bearing, comprising elastic means between one or more of the bearing members and the support or abutment for the same, with means that will prevent or control any tendency of the bearing members to be set into vibration without materially interfering with the pressure-distributing function of such elastic means.

Another object of this invention is to provide a bearing, comprising elastic means between one or more of the bearing members and the support or abutment for the same, with a plurality of means for dampening vibratory movement of said bearing members and means interconnecting said vibration-dampening means so that a progressive compression or expansion of said elastic means will not tend to produce axial displacement of the bearing surfaces.

Other objects relate to the provision of a bearing of the type characterized with vibration dampening means which are simple in construction and efficient in operation.

Stated broadly, the invention comprises a bearing having relatively movable bearing members, elastic means coacting with one or more of said bearing members, and means to dampen or prevent undesirable oscillatory movement of said bearing members. A plurality of virbration-dampening means are preferably employed, and said means may be interconnected to provide for progressive contraction and expansion of said elastic means.

The invention is capable of receiving a variety of mechanical expressions, several of which are shown on the accompanying drawings, but it is to be expressly understood that the drawings are for purposes of illustration only and are not to be construed as a definition of the limits of the invention, reference being had to the appended claims for that purpose.

In said drawings, wherein the same reference characters are employed to designate corresponding parts in the several figures,—

Figure 1:
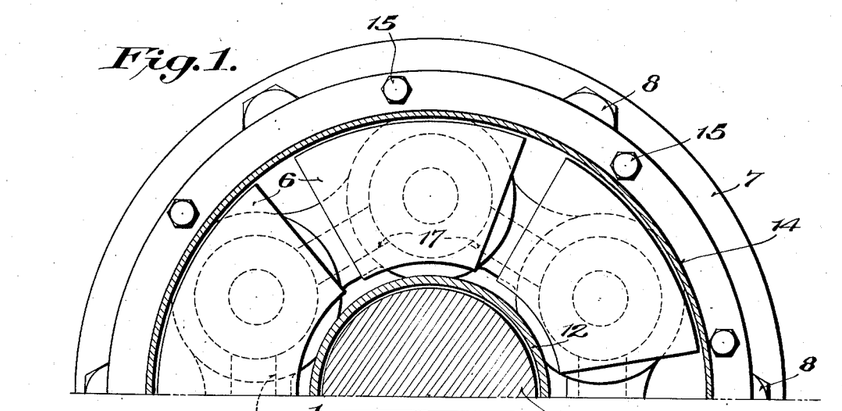
Fig. 1 is a half plan view of the stationary member of a vertical thrust bearing embodying the present invention.
Figure 2:
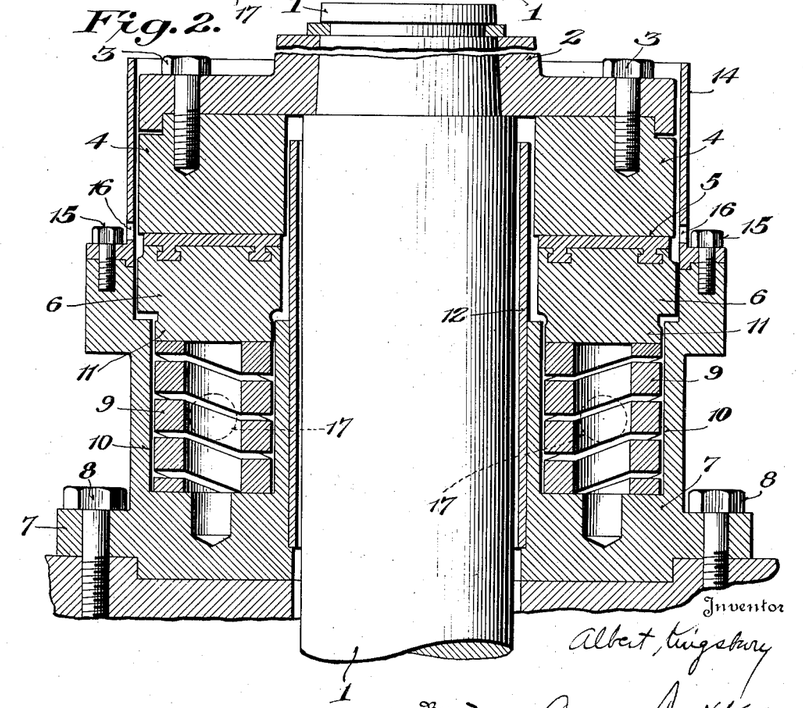
Fig. 2 is an axial section of the bearing shown in Fig. 1.

In the form shown in Figs. 1 and 2, 1 is any suitable shaft provided with a rotatable bearing member of any suitable construction, shown as a thrust block 2 to which is secured in any suitable way, as by dowel pins or bolts 3, a runner or thrust collar 4 having a bearing surface 5. Co-acting with the bearing surface of the thrust collar 4, is a stationary bearing member 6 of any suitable construction. Said stationary bearing member may be a rigid or a flexible member of either continuous or semi-continuous construction, or it may be composed of flexibly-connected rigid portions, or, as shown in Figs. 1 and 2, it may be composed of a plurality of separate shoes of any suitable construction.

Interposed between said stationary bearing member 6 and a base ring 7 of any suitable construction—which base ring may be secured to the base or frame in any suitable way, as by bolts 8—is elastic means for suitably distributing the bearing pressure over the bearing surfaces of said bearing members. Said elastic means may be of any suitable construction, desirably taking the form of springs. In the construction illustrated in Figs. 1 and 2, said elastic means is composed of a plurality of circumferentially-spaced helical springs 9, one under each of said shoes, and said springs may be mounted in any suitable way, as by being respectively positioned in recesses 10 in the base ring 7.

In accordance with the present invention, means are provided for preventing or dampening vibratory movement of the springs 9 to ensure against the bearing members being given an undesirable oscillatory movement. Said dampening means may be of any suitable construction, preferably taking the form of one or more dash-pots. These dash-pots may be provided in a variety of ways, but for simplicity of construction, preferably employ the recesses 10 for the springs 9 as the chamber members of such dash-pots, although said dash-pot chambers may, if desired, be provided by separate recesses in either the stationary bearing member 6 or the base ring 7. In the form shown in Figs. 1 and 2, each shoe is also provided with a piston-like extension 11, either integral with the shoe or connected thereto in any suitable way, which extensions project into the corresponding recesses 10 and constitute the piston members of the dash-pots. Each piston-like extension 11 has a suitable clearance with the wall of its recess 10 to suitably provide for the passage of lubricating oil into and out of the recess at a rate that will properly dampen the movement of the corresponding spring without materially interfering with its pressure-distributing function. The amount of this clearance will of course vary with different bearings and depend upon a number of different factors including the load on the bearing, the viscosity of the lubricating oil, the strength or flexibility of the springs, etc.

In order that the bearing surfaces may run immersed in oil, the base ring 7 is shown as provided with an inner sleeve-like oil-retaining wall 12 and the base or frame is also provided with a suitable exterior oil-retaining wall 13 (see Fig. 9) which walls, with said base or frame, provide an oil well in which the bearing surfaces may run submerged in oil. In the form shown in Figs. 1 and 2 the base ring is also provided with a cylindrical baffle plate 14, suitably connected therewith as by bolts 15, and having apertures 16 opposite the bearing surfaces and through which the oil may pass into the well proper, said apertures 16 being of such size as to prevent the bearing surfaces from running dry under the action of centrifugal force on the lubricant. The base ring may also be provided with suitable apertures or passages to enable the lubricant to flow from the well proper to the inner side of the bearing surfaces, or the oil may be supplied directly to the bearing surface, with or without pressure, in any suitable way.

In the form shown the bearing shoes are designed to tilt both radially and circumferentially and, to this end, they may be mounted in any suitable way. In the construction illustrated, the springs 10 permit the shoes to tilt circumferentially so as to form wedge-shaped oil films between the bearing surfaces and radially so as to compensate for any tendency of the bearing surfaces to become distorted owing to the heating of the parts during the operation of the bearing or for any other reason. The extensions 11 may, however, be made separate from the bodies of the shoes and separate provision be made for either or both of the circumferential and the radial tilting of the shoes.

If for any reason recurring impulses on or in the bearing tend to set the springs 9 into vibration, the bearing shoes can respond to such tendency only as permitted by the flow of the lubricating oil into and out of the recesses 10. As the clearance between the piston-like extensions 11 and the walls of said recesses may be selected to regulate this flow of oil into and out of said recesses at any desired rate, such tendency of the bearing members to oscillate may be so far retarded or dampened as to effectively prevent any periodical vibration of the springs or bearing members. At the same time, the action of such dampening means does not materially interfere with the pressure distributing function of the springs 9.

If the tendency to set the springs 9 into vibration be due to one or more high spots in the bearing surfaces or to the rotatable bearing member running out of true, the spring or other elastic means which is beneath a high spot at any given point is depressed or contracted and, as this high spot is continuously rotating, there is a progressive compression of the springs or other elastic means. Under such circumstances, the resistance to sudden compression of the springs or other elastic means by the dash-pot devices heretofore described would tend to cause a slight axial movement of the shaft—although this movement would not become amplified owing to the dampening action of said dash-pot devices. To provide for a progressive compression of the elastic means without a tendency to displace the bearing surfaces axially, the vibration dampening devices may be interconnected in any suitable way so that the elastic means may be progressively compressed without substantially interfering with the dampening action of the same. In the form shown in Figs. 1 and 2, the recesses 10, which constitute the cylinder elements of the dash-pots, are interconnected by passages 17 so that the oil may flow progressively from one dash-pot to another in response to a progressive compression of the successive springs 9.

Figure 3:
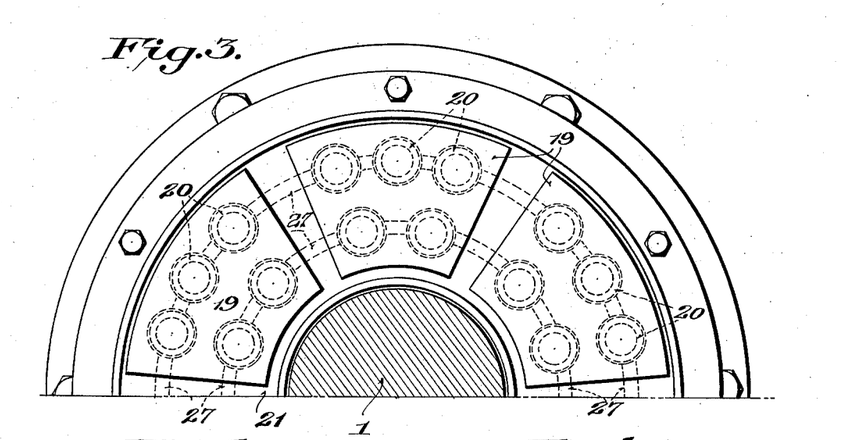
Fig. 3 is a half plan view of a bearing employing a different arrangement of elastic means and also embodying the present invention.

In place of a single spring under each of the bearing shoes, the respective bearing shoes 19 or other bearing member or members, may be provided with a plurality of helical springs 20 as shown in Fig. 3. When a plurality of springs are employed with each shoe or other bearing member, the means for dampening vibration thereof may be supplied in any suitable way. In the form shown in Fig. 4, the base ring 21 is provided with a plurality of recesses 22 to receive the respective springs 20, and one or more of these springs coact with blocks 23 having a suitable clearance, as heretofore explained, with the walls of the recesses 22. Said blocks 23 may be suitably attached to or form a part of the shoes or other bearing member 19, or the shoes or other bearing member may rest upon the top of said blocks, in which event any suitable means may be provided to prevent excessive displacement of said blocks.

As in the construction of Figs. 1 and 2, the respective recesses 22, which constitute the cylinder elements of the dash-pot devices, may be interconnected in any suitable way.

Figures 4, 5:
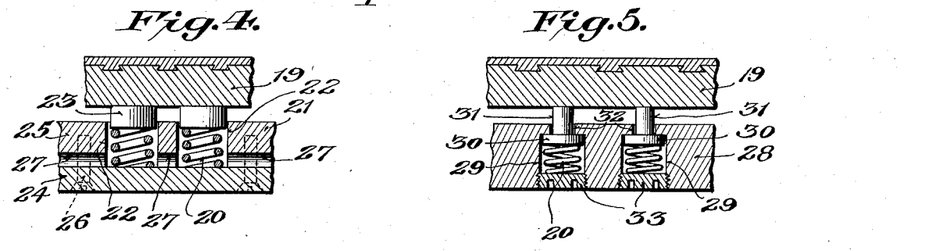
Figs. 4, 5, 6 and 7 are fragmentary schematic views illustrating other arrangements of the elastic means and also embodying the present invention.

In the form shown in Fig. 4, the base ring 21 is formed in two parts, a base member 24 and an apertured member 25 adapted to be retained on the base member 24 in any suitable way as by screws 26. The apertures in the member 25 provide the cylindrical walls of the recesses 22, while the top of the base member 24 provides the bottom of said recesses. The under face of the apertured member 25 may be provided with circumferentially extending grooves 27 which open into the apertures providing the recesses 22, and said grooves 27, together with the upper face of the base member 24, thereby provide passages which interconnect the cylinder elements of the dash-pot devices and permit the lubricating oil to flow progressively from one cylinder to the next in the manner heretofore described.

In the form shown in Fig. 5, the base ring 28 is provided with a plurality of recesses 29 to receive the respective springs 20, and one or more of the springs coact with piston-like elements 30 having suitable clearance with the walls of the recesses 29 as heretofore described. Said piston-like elements 30 have shanks 31 connected to, or upon which rest, the shoes or other bearing member 19, said shanks extending through apertures 32 which communicate with said recesses and have suitable clearance with said shanks so as to permit the lubricating oil to flow into and fill the dash-pot devices afforded by the recesses 29 and the piston elements 30. In this construction, the springs are inserted from the bottom of the base ring and retained in position by suitable plugs or thimbles 33 which also constitute the lower abutments for the springs 20.

The cylinders 29 of these dash-pot devices may also be interconnected in any suitable way if desired, as by dividing the base ring 29 into two portions as described in connection with the embodiment of Fig. 4.

Figures 6, 7:
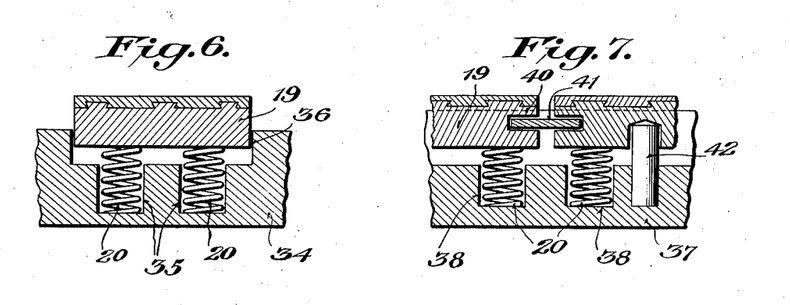

In place of providing a separate piston element for coaction with each spring, each shoe itself may constitute the piston element of the dash-pot as shown in Fig. 6, wherein the base ring 34 is provided with a plurality of recesses 35 for the reception of the springs 20 and with an enlarged recess 36 substantially conforming in outline to the outline of the shoe 19, the clearance between each shoe and its recess 36 being such as to properly restrict the flow of oil into and out of said recess, as heretofore described.

The spring receiving recesses 35 or the recesses 36 may, if desired, be interconnected by constructing the base ring 34 in the manner heretofore described in connection with the embodiment of Fig. 4, or said recesses may be interconnected in any other suitable way.

Figure 8:
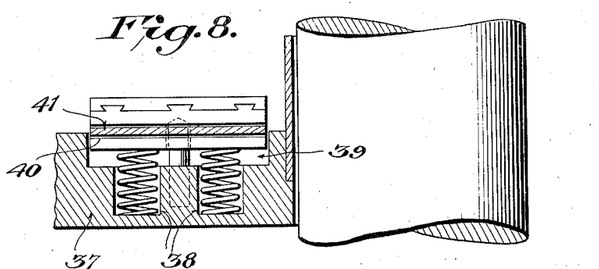
Fig. 8 is a fragmentary section at right angles to Fig. 7.

In place of, or in conjunction with the arrangements heretofore described, dampening means may be interposed between the shoes when separate shoes are employed. In the form shown in Figs. 7 and 8, the base ring 37 is provided with a plurality of recesses 38 for the reception of the springs 20, and is formed circumferentially as a channel 39, as shown in Fig. 8. The sides of the channel recess 39 closely embrace the inner and outer circumferential edges of the bearing shoes 19, but have suitable clearance therewith so as to properly restrict the flow of lubricating oil into and out of said channel recess 39 in the manner heretofore described. To properly restrict the flow of oil into and out of the recess 39 between the successive bearing shoes, when a plurality of shoes are employed, said shoes are respectively provided in their radial edges with lateral recesses 40, and positioned within each pair of juxtaposed recesses 40 is a plate 41, preferably of flexible material, bridging the space between each adjacent pair of shoes and having sufficient clearance with the walls of the recesses 40 to properly control the flow of lubricating oil into and out of the channel space 39. To prevent improper displacement of the respective shoes a dowel pin 42 may be mounted in the base ring for engagement loosely in a recess in the under side of each shoe.

In this embodiment of the invention, the channel space 39 itself constitutes a means of communication between the spaces under the respective shoes and provides for a progressive depression of the successive springs in response to a rotating high spot on the opposed bearing member. A channel-shaped base ring having suitable clearance with the inner and outer circumferential edges of the bearing member, so that the bearing member by cooperation with the channel space in the base ring shall provide dampening means to prevent or control oscillation of the bearing members, may also be employed where the bearing member is a continuous or semi-continuous ring.

Figure 9:
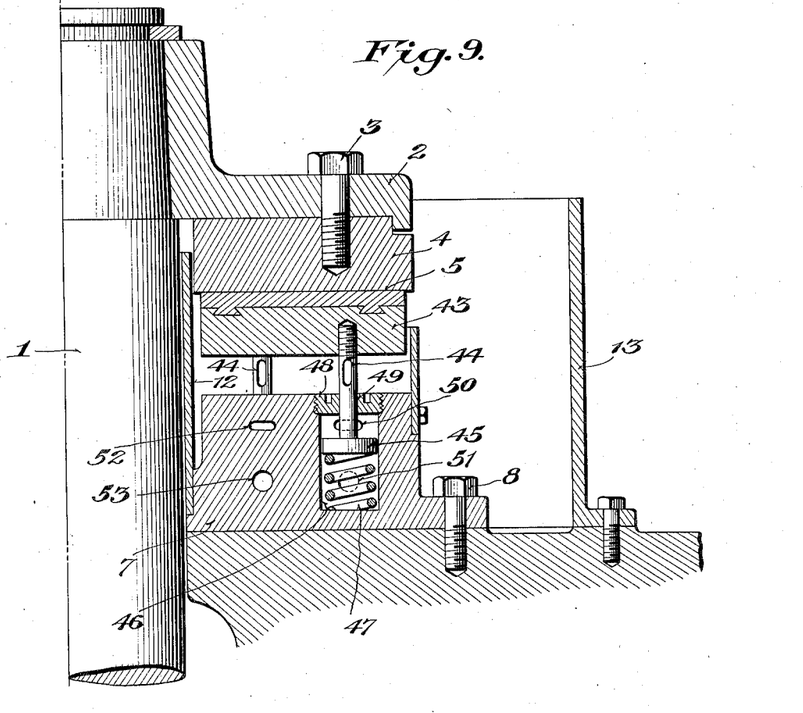
Fig. 9 is a half axial section of a bearing constituting another embodiment of the present invention.

Under some circumstances it may be desirable to provide dampening means for the elastic means which operates positively in both directions of movement of the bearing member. Such a construction is illustrated in Fig. 9, wherein the shoes 43, or other suitable bearing member or members, are positively connected to the shanks 44 of piston-like elements 45 which are reciprocatory in recesses 46 and have suitable clearance with the walls of said recesses to restrict the flow of lubricating oil between the same as heretofore described. Coil springs 47 are mounted in said recesses 46 and cooperate with the piston-like elements 45 to afford an elastic support for the bearing member 43. In this embodiment of the invention, each of the recesses 46 is closed at its upper or outer end by a plug or thimble 48 provided with a central aperture 49 which has such clearance with the shank 44 as to enable the oil to flow into and fill the recess 46 and yet to so restrict the flow of oil therefrom, when the spring 47 tends to raise the piston-like element 45, that the recess and piston operate as a dash-pot during upward as well as downward movement of said element 45. This double acting dash-pot construction may also be employed in any of the other embodiments illustrated, if desired, in which event the base ring 7 must be firmly attached to the base or frame, as by the bolts 8, and the rotating bearing member 4 should be firmly attached to the thrust block 2, as by the bolts 3.

As in the other embodiments of the invention illustrated, the cylinder elements of the dash-pots may be interconnected so as to provide for a progressive compression of the springs 47, but where a double acting dash-pot is employed separate passages must be used to connect the respective chambers which are on opposite sides of the piston-like elements. In the form shown in Fig. 9, a passage 50 connects the chambers above the piston-like elements 45 and a passage 51 connects the chambers below said piston-like elements. In this embodiment two circumferential series of piston-like elements 45 and springs 47 are illustrated, and a second set of passages 52 and 53 are shown for respectively connecting the chambers above and below the piston-like elements in the inner series of recesses 46. A separate set of passages 52 and 53 is not necessary, however, as all of the upper chambers could be interconnected by a single series of zig-zag passages 50 and all of the lower chambers could be connected by a second single series of zig-zag passages 51.

While the invention has been described and illustrated as employed in bearings having separate bearing shoes, it may be employed with equal facility in bearings wherein the elastically-supported bearing member is more or less continuous in structure and, or made up of one or more yielding members or yieldingly connected rigid members. Thus, as heretofore pointed out, the bearing member 19 of Figs. 4 and 5 may be considered as a fragment of a continuous or semi-continuous flexible or rigid bearing member. Furthermore, while the invention has been shown as applied only in conjunction with elastic means between the stationary bearing member and its support or abutment it is to be understood that the invention is of equal utility in conjunction with elastic means between the rotating bearing member and its suppport or abutment, or in conjunction with both. Furthermore, while the dash-pot chambers have been shown as positioned in the support or abutment, it is to be understood that such chambers could be positioned in the bearing member and the piston-like elements be connected to or operatively related with said support or abutment, and it is to be expressly understood that this reversal in the arrangement of the dash-pot elements is within the contemplation of the appended claims. Furthermore, while the invention has been shown as applied to bearings wherein one or more of the bearing members is composed of tiltably mounted shoes, it is to be understood that the invention is applicable to bearings employing non-tiltably mounted bearing members and, while in the structures shown springs are relied upon to provide the tilting mounting of the bearing members, it is to be understood that the bearing members may be constructed or mounted in any other suitable way to provide tiltable support for the same. Furthermore, while springs only have been illustrated as the pressure distributing means, it is to be understood that any other suitable form of elastic means may be employed. Furthermore, while the recesses for the springs have been employed as the chamber elements of the dash-pots, such is not essential, as the piston elements may be provided for cooperation with separate chambers provided therefor. Furthermore, while the chamber elements of the dash-pot devices have been shown as interconnected in some embodiments of the invention and not in others, it is to be expressly understood that the interconnection of the dash-pot devices may be employed in conjunction with any of the several embodiments of this invention or may be omitted from any of such embodiments.

It will therefore be perceived that a bearing has been provided, comprising elastic means between one or more of the bearing members and the support or abutment for the same, wherein any tendency of the bearing members to be set into vibration by recurring impulses, either from within or without the bearing, is effectively prevented or controlled by means which dampen any tendency of the elastic means to impose an undesirable or improper oscillatory movement on the bearing members. At the same time the construction is such as not to interfere with the proper functioning of said elastic means in the desired distribution of the bearing pressure over the bearing surfaces of said bearing members. Furthermore, means have been provided whereby the elastic means may be progressively depressed by a rotating high spot without producing any tendency of the bearing surfaces to move axially.

While the embodiments of the invention shown on the drawings have been described with considerable particularity, it is to be expressly understood that the invention is not restricted thereto, as the same is capable of receiving a variety of mechanical expressions, some of which will now readily suggest themselves to those skilled in the art while certain features thereof are capable of use without other features thereof; changes may also be made in the details of construction, arrangement and proportion of parts without departing from the spirit of this invention. It is also to be expressly understood that the invention is not limited to use in thrust bearings, as it is of utility wherever one or more bearing members are mounted in coaction with elastic means which may set the same into undesirable oscillatory movement. Therefore, reference is to be had to the claims hereto appended for a definition of the limits of the invention.

This application is a continuation in part of my application Ser. No. 309,921, filed July 10, 1919, for "bearings."

What is claimed is:—

1. A bearing including relatively movable bearing members, elastic means supporting one or more of said bearing members in bearing engagement with their relatively movable bearing members, and means to dampen oscillatory movement of said bearing members.

2. A bearing including relatively movable bearing members, elastic means mounting one or more of said bearing members in bearing engagement with their relatively movable bearing members, and means constituting one or more dashpots operatively related to said bearing members.

3. A bearing including relatively movable bearing members, one or more springs associated with said bearing members for mounting the same in bearing engagement with their relatively movable bearing members, and means to dampen vibratory movement of said springs.

4. A bearing including relatively movable bearing members, one or more springs associated with said bearing members for mounting the same in bearing engagement with their relatively movable bearing members, and means constituting one or more dash-pots coacting with said springs to dampen vibratory movement thereof.

5. A bearing including relatively movable bearing members, means whereby the pressure on said bearing members is equitably distributed, and means to prevent said last-named means from setting said bearing members into vibration.

6. A bearing including relatively movable bearing members, means whereby the pressure on said bearing members is equitably distributed, and means to dampen oscillatory movement of said bearing members.

7. A bearing including relatively movable bearing members, elastic means coacting with said bearing members to suitably distribute the pressure thereon, and means to prevent said elastic means from setting said bearing members into vibration.

8. A bearing including relatively movable bearing members, elastic means coacting with said bearing members to suitably distribute the pressure thereon, and means to dampen oscillatory movement of said bearing members.

9. A bearing including relatively movable bearing members, elastic means coacting with said bearing members to suitably distribute the pressure thereon, and one or more dashpots operatively related to said elastic means to dampen vibration thereof.

10. A bearing including relatively movable bearing members, one or more springs coacting with said bearing members to suitably distribute the pressure thereon, and means to prevent said spring from setting said bearing members into vibration.

11. A bearing including relatively movable bearing members, one or more springs coacting with said bearing members to suitably distribute the pressure thereon, and means to dampen oscillatory movement of said bearing members.

12. A bearing including relatively movable bearing members, one or more springs coacting with said bearing members to suitably distribute the pressure thereon, and one or more dash-pots coacting with said springs to dampen vibration thereof.

13. A bearing including relatively movable bearing members, a support or abutment having one or more recesses, pressure distributing springs in said recesses coacting with one of said bearing members, and means movable with said last-named bearing member and coacting with said recesses to dampen oscillatory movement of said bearing member.

14. A bearing including relatively movable bearing members, a support or abutment having one or more recesses, springs in said recesses coacting with one of said bearing members for mounting the same, and piston-like elements movable with said last-named bear-member and reciprocatory in said recesses to dampen oscillatory movement of said bearing member.

15. A bearing including relatively movable bearing members, a support or abutment having one or more recesses, elastic means coacting with one of said bearing members for mounting the same, and means movable with said last-named bearing member and coacting with said recess or recesses to dampen oscillatory movement of said bearing member.

16. A bearing including relatively movable bearing members, a support or abutment having one or more recesses, elastic means coacting with one of said bearing members for mounting the same, and one or more piston-like elements movable with said last-named bearing member and reciprocatory in said recess or recesses to dampen oscillatory movement of said bearing member.

17. A bearing including relatively movable bearing members, circumferentially distributed springs coacting with one of said bearing members for mounting the same and positioned in recesses, and means coacting with said recesses to dampen vibration of said springs.

18. A bearing including relatively movable bearing members including a plurality of bearing shoes, a support or abutment, springs between said shoes and said support or abutment positioned in recesses in the latter, and means movable with said shoes and coacting with said recesses to dampen vibratory movement of said springs.

19. A bearing including relatively movable bearing members, a support or abutment for said bearing members with respect to which one of said bearing members is movable, and means between said last-named bearing member and said support or abutment for restricting the flow of lubricant into and out of the space therebetween.

20. A bearing including relatively movable bearing members, a support or abutment with respect to which one of said bearing members is movable, elastic means between said last-named bearing member and said support or abutment for mounting said bearing member, and means between said last-named bearing member and said support or abutment for restricting the flow of lubricant into and out of the space therebetween.

21. A bearing including relatively movable bearing members, elastic supporting means coacting with one of said bearing members for mounting the same, a support or abutment with respect to which said last-named bearing member is movable, said support or abutment being provided with one or more recesses, and one or more elements movable with said last-named bearing member and reciprocatory in said recess or recesses to dampen oscillatory movement of said bearing member in both directions.

22. A bearing including relatively movable bearing members, one of said members including a plurality of bearing shoes, a support or abutment for said bearing shoes, springs between said bearing shoes and said support or abutment, and vibration-dampening means between said bearing shoes and said support or abutment.

23. A bearing including relatively movable bearing members, a support or abutment for one of said bearing members, springs between said bearing member and said support or abutment, and piston and cylinder dash-pot elements respectively related to said bearing member and said support or abutment.

24. A bearing including relatively movable bearing members, one of said members including a plurality of bearing shoes, a support or abutment for said bearing shoes for mounting the same, elastic means coacting with said bearing shoes for mounting the same, and dash-pot elements respectively related to said bearing shoes and said support or abutment.

25. A bearing including relatively movable bearing members, one of said members including a plurality of bearing shoes, a support or abutment for said bearing shoes, elastic means coacting with said bearing shoes for mounting the same, and vibration-dampening means between said bearing shoes and said support or abutment.

26. A bearing including relatively movable bearing members, a support or abutment for one of said bearing members provided with one or more recesses, elastic means between said support or abutment and said bearing member for mounting the latter, and one or more elements movable with said bearing member and reciprocatory in said recess or recesses to dampen vibratory movement of said elastic means.

27. A bearing including relatively movable bearing members, elastic means associated with said bearing members for mounting the same, a plurality of devices for dampening vibratory movement of said bearing members, and means interconnecting said vibration-dampening devices whereby progressive compression of said elastic means effects a progressive action of said dampening devices.

28. A bearing including relatively movable bearing members, a plurality of springs for equitably distributing the pressure on said bearing members, a plurality of devices for dampening vibratory movement of said bearing members, and means interconnecting said vibration-dampening devices whereby progressive compression of said elastic means effects a progressive action of said dampening devices.

29. A bearing including relatively movable bearing members, elastic means interposed between one of said bearing members and its support or abutment, recesses in said support or abutment cooperating with means on said last-named bearing member to dampen vibratory movement of said bearing members, and passages interconnecting said recesses.

30. A bearing including relatively movable bearing members, springs interposed between one of said bearing members and its support or abutment, recesses in said support or abutment in which said springs are positioned, means on said last-named bearing member cooperating with said recesses to dampen vibratory movement of said bearing members, and passages interconnecting said recesses.

31. In a bearing, the combination of relatively movable bearing members including a plurality of bearing shoes, elastic means on which said shoes are tiltably mounted, dash-pot devices cooperating with said shoes to dampen vibratory movement thereof, and passages connecting the chamber members of said dash-pot devices.

32. In a bearing, the combination of relatively movable bearing members including a plurality of bearing shoes, circumferentially-distributed springs on which said shoes are tiltably mounted, dash-pot devices cooperating with said shoes to dampen vibratory movement thereof and passages connecting the chamber members of said dash-pot devices.

33. A bearing including relatively movable bearing members, elastic means on which one of said bearing members is mounted, double-acting dash-pot devices connected to said last-named bearing member for dampening vibratory movement thereof, and passages connecting the respective chambers above and below the piston elements of said dash-pot devices.

34. A bearing including relatively movable bearing members, circumferentially-distributed springs on which one of said bearing members is mounted, double-acting dash-pot devices connected to said last-named bearing member for dampening vibratory movement thereof, and passages connecting the respective chambers above and below the piston elements of said dash-pot devices.

35. A bearing including relatively movable bearing members, elastic means on which one of said bearing members is mounted, dash-pot devices cooperating with said last-named bearing member to dampen vibratory movement of said bearing members, and passages interconnecting the chambers of said dash-pot devices.

36. A bearing including relatively movable bearing members, circumferentially-distributed springs on which one of said bearing members is mounted, dash-pot devices cooperating with said last-named bearing member to dampen vibratory movement of said bearing members, and passages interconnecting the chambers of said dash-pot devices.

37. A bearing including relatively movable bearing members, springs interposed between one of said bearing members and its support or abutment, dash-pot recesses in which said springs are located, and passages interconnecting the inner portions of said recesses.

38. A bearing including relatively movable bearing members, elastic means cooperating with one or more of said bearing members for equitably distributing the load thereon, means for preventing said elastic means from setting said bearing members into vibrations, and connecting means for enabling said elastic means to yield progressively.

39. A bearing including relatively movable bearing members, elastic means cooperating with one or more of said bearing members for equitably distributing the load thereon, a plurality of dash-pots for dampening the movement of said bearing members, and connections between said dash-pots enabling said elastic means to yield progressively.

40. A bearing including relatively movable bearing members, springs on which one or more of said bearing members are mounted, and intercommunicating dash-pots for dampening vibratory movement of said bearing members.

41. A bearing including relatively movable bearing members, means whereby the pressure on said bearing members is equitably distributed, and one or more dash-pots operatively related to said bearing members to dampen vibratory movement of the same.

In testimony whereof I have signed this specification.

ALBERT KINGSBURY.